United States Patent [19]
Pappalardo et al.

[11] Patent Number: 6,137,217
[45] Date of Patent: Oct. 24, 2000

[54] FLUORESCENT LAMP WITH IMPROVED PHOSPHOR BLEND

[75] Inventors: Romano G. Pappalardo, Sudbury; Roger B. Hunt, Jr., Medfield, both of Mass.

[73] Assignee: GTE Products Corporation, Danvers, Mass.

[21] Appl. No.: 07/937,936

[22] Filed: Aug. 28, 1992

[51] Int. Cl.[7] .................................. H01J 1/62
[52] U.S. Cl. ............................ 313/487; 313/467
[58] Field of Search .................... 313/467, 468, 313/485, 486, 487, 496, 572, 577; 427/67, 69; 252/301.4 F, 301.4 H, 301.4 R, 301.4 P

[56] References Cited

U.S. PATENT DOCUMENTS

| | | | |
|---|---|---|---|
| 3,858,082 | 12/1974 | Thornton, Jr. | 313/487 |
| 3,875,453 | 4/1975 | Thornton, Jr. | 313/487 |
| 3,937,998 | 2/1976 | Verstegen et al. | 313/487 |
| 4,055,781 | 10/1977 | Schreurs et al. | 313/487 |
| 4,231,892 | 11/1980 | Chang et al. | 252/301.6 |
| 4,251,750 | 2/1981 | Galien et al. | 313/487 |
| 4,266,161 | 5/1981 | Kasenga | 313/487 |
| 4,296,353 | 10/1981 | Walter | 313/487 |
| 4,305,019 | 12/1981 | Gragg et al. | 313/487 |
| 4,423,349 | 12/1983 | Nakajima et al. | 313/487 |
| 4,551,397 | 11/1985 | Yaguchi et al. | 428/691 |
| 4,602,188 | 7/1986 | de Hair et al. | 313/487 |
| 4,623,816 | 11/1986 | Hoffman et al. | 313/487 |
| 4,717,857 | 1/1988 | Wozniak et al. | 313/487 |
| 4,728,459 | 3/1988 | Fan | 252/301.5 |
| 4,797,594 | 1/1989 | Sigai et al. | 313/488 |
| 4,806,824 | 2/1989 | Paynter et al. | 313/486 |
| 4,874,985 | 10/1989 | Hase et al. | 313/487 |
| 4,988,914 | 1/1991 | Rutfield et al. | 313/486 |
| 5,051,277 | 9/1991 | Sigai et al. | 427/69 |
| 5,087,523 | 2/1992 | Klinedinst et al. | 427/69 |
| 5,188,763 | 2/1993 | Chenot et al. | 252/301.6 F |

FOREIGN PATENT DOCUMENTS 60-14743  1/1985  Japan ............................ H01J 61/42

OTHER PUBLICATIONS

*IES Lighting Handbook*, Reference Volume, Fifth Edition 1972, Illuminating Engineering Society, p. 2–9.

Primary Examiner—Xiao Wu
Attorney, Agent, or Firm—Robert F. Clark

[57] ABSTRACT

A fluorescent lamp comprises at least one layer of a four-component phosphor blend for producing visible illumination having a white color. The quad-phosphor blend comprising a first and second red-emitting phosphor component with each red-emitting phosphor component having different visible emission spectrum principally in the 590 to 630 nm wavelength range. A third blue-emitting phosphor component has an emission spectrum principally in the 430 to 490 nm wavelength range. A fourth no-rare-earth green-emitting phosphor component has an emission spectrum principally in the 500 to 570 nm wavelength range. The relative proportions of the phosphor components are such that an enhanced color rendering index is produced as compared to tri-component blends formed from only three of the phosphor components.

18 Claims, 7 Drawing Sheets

FLUORESCENT LAMP WITH IMPROVED PHOSPHOR BLEND

TECHNICAL FIELD OF THE INVENTION

This invention relates to fluorescent lamps and fluorescent lamp phosphors.

BACKGROUND OF THE INVENTION

Desirable fluorescent lamp characteristics are high brightness and high color rendering at an economical cost. To achieve this goal, such lamps as the Sylvania™ Octron and Designer series of lamps are constructed with two layers of phosphor coatings. The first or the base coat is an inexpensive halophosphate phosphor of the desired lamp color temperature. The second or skin coat is comprised of three expensive rare earth activated phosphors, emitting in the red, green and blue spectral regions, blended to effect a composite white emission of desired color temperature. In this configuration the expensive tri-phosphor blend absorbs the ultra-violet excitation energy of the Hg plasma in excess proportion to the weight of the phosphor in the lamps. The halophosphate base coat absorbs the excitation energy that eludes the skin coat, while diluting the high CRI and brightness capability of the tri-phosphor blend. Even though these phosphor blends achieve desirable economic and performance characteristics, further improvements are desirable.

U.S. Pat. No. 4,623,816 to Hoffman et al relates to a fluorescent lamp utilizing a dual phosphor layer coating having a conventional calcium haloapatite phosphor and a top phosphor layer comprising a tri-phosphor blend including a lanthanum cerium orthophosphate phosphor activated with terbium ion as the green color component along with an europium-activated yttrium oxide phosphor as the red color component.

U.S. Pat. No. 4,296,353 to Walter relates to a fluorescent lamp having a coating on the inner surface of the glass envelope comprising a blend of four narrow band emitting phosphors. The spectral power distribution curves for the phosphor blends consist of four narrow bands centered at about 450–480 nm, 510–540 nm, 570–590 nm, and 600–630 nm. The particular phosphors utilized were divalent europium activated barium magnesium aluminate, manganese activated zinc orthosilicate, trivalent dysposium activated yttrium vanadate, and europium activated yttrium oxysulfide. Phosphor blends include a Cool White lamp, Warm White lamp, and Daylight lamp.

A skin coat or tri-phosphor blend that has been used is a red $Y_2O_3:Eu^{+3}$ (Sylvania Type 2342), a green $CeMgAl_{11}O_{19}:Tb^{+3}$ (Sylvania Type 2297), and a blue $BaMg_2Al_{16}O_{27}:Eu^{+2}$. Fluorescent lamps utilizing the above skin coat have achieved high color rendering and high brightness while demonstrating excellent durability in the harsh environment of the fluorescent lamp. However, additional and further improvements are desirable. Especially desirable is the production of a blend which produces efficient white color emission and improved color rendition at an even more economical cost.

The luminous efficacy, color rendering index and other lamp output characteristics may be varied depending upon the particular composition of the lamp phosphors utilized. Certain terms as used in this specification have meanings which are generally accepted in the lighting industry. These terms are described in the IES LIGHTING HANDBOOK, Reference Volume, 1984, Illuminating Engineering Society of North America. The color rendering index of light source (CRI) is a measure of the degree of color shift objects undergo when illuminated by the light source as compared with the color of those same objects when illuminated by a reference source of comparable color temperature. The CRI rating consists of a General Index, $R_a$, based on a set of eight test-color samples that have been found adequate to cover the color gamut. The color appearance of a lamp is described by its chromaticity coordinates which can be calculated from the spectral power distribution according to standard methods. See CIE, *Method of measuring and specifying color rendering properties of light sources* (2nd ed.), Publ. CIE No. 13.2 (TC-3,2), Bureau Central de la CIE, Paris, 1974. The CIE standard chromaticity diagram includes the color points of black body radiators at various temperatures. The locus of blackbody chromaticities on the x,y-diagram is known as the Planckian locus. Any emitting source represented by a point on this locus may be specified by a color temperature. A point near but not on this Planckian locus has a correlated color temperature (CCT) because lines can be drawn from such points to intersect the Planckian locus at this color temperature such that all points look to the average human eye as having nearly the same color. Luminous efficacy of a source of light is the quotient of the total luminous flux emitted by the total lamp power input as expressed in lumens per watt (LPW or lm/W).

The present invention addresses the problem of how to economically elevate color rendering while retaining high light flux.

BRIEF SUMMARY OF THE INVENTION

In accordance with the present invention, there is provided a fluorescent lamp comprising a glass envelope having electrodes at its ends, a mercury and inert gas filling within the envelope which produces ultraviolet radiation and a coating on the interior surface of the glass envelope comprising at least one layer of a quad-phosphor blend for a converting a substantial portion of said ultraviolet radiation to visible illumination having a white color. The quad-phosphor blend comprising a first and second red color emitting phosphor component with each red color emitting phosphor component having different visible emission spectrum principally in the 590 to 630 nm wavelength range. A third, blue-emitting phosphor component has an emission spectrum principally in the 430 to 490 nm wavelength range. A fourth, green-emitting phosphor component has an emission spectrum principally in the 500 to 570 nm wavelength range.

The first red color emitting phosphor component is a rare-earth activated phosphor and the second phosphor component is non-rare-earth activated phosphor. The relative proportions of the phosphor components are such that an enhanced color rendering index is produced as compared to tri-component blends formed from a three-phosphor blend excluding one of the red components.

DETAILED DESCRIPTION

Figure 1:
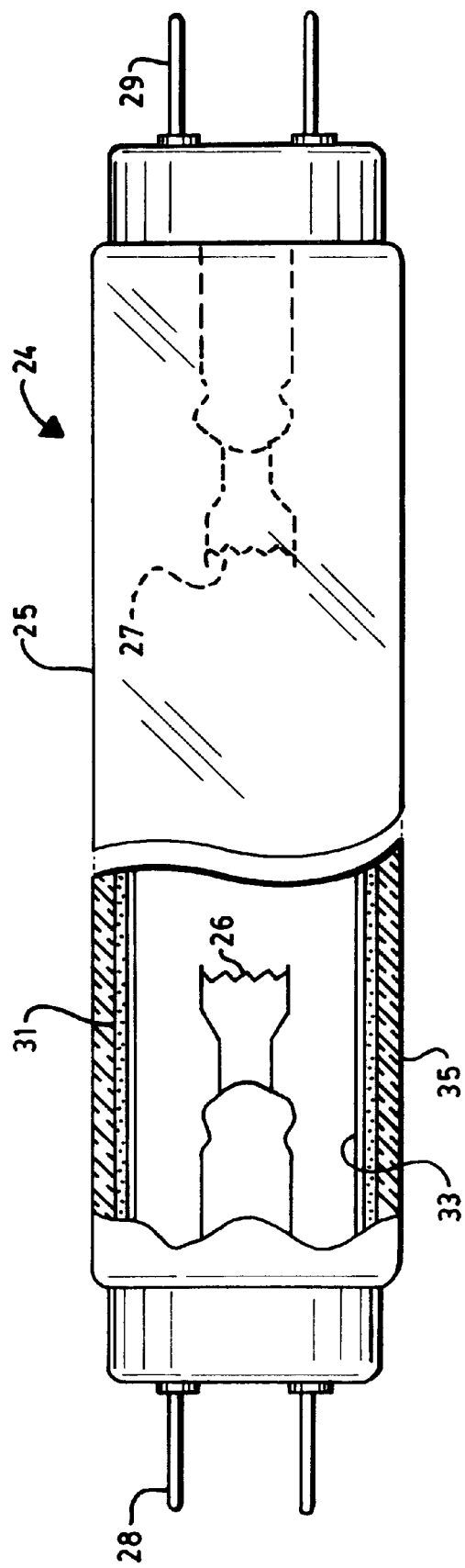
FIG. 1 is a perspective view, partially broken away, of a low-pressure mercury-discharge fluorescent lamp construction utilizing a dual layer phosphor coating.

Referring to FIG. 1, there is shown a fluorescent lamp 24 containing phosphors capable of UV-to-visible conversion. The lamp 24 comprises a tubular, hermetically sealed, glass envelope 25. Electrodes 26 and 27 are sealed in the ends of envelope 25. Suitable terminals 28 and 29 are connected to the electrodes 26 and 27 and project from envelope 25. The electrodes 26 and 27 extend through glass presses in mount stems to the terminals 28 and 29.

The interior of the tube is filled with an inert gas such as argon or a mixture of argon and krypton at a low pressure, for example 2 torr, and a small quantity of mercury, at least enough to provide a low vapor-pressure during operation. An arc generating and sustaining medium, such as one or more inert gases and mercury is included within envelope 25 so that ultraviolet radiation is produced in the interior of the glass envelope during lamp operation. A phosphor coating 31 on the interior surface of the glass envelope converts the emitted ultraviolet radiation to visible illumination having a white color.

In accordance with the principles of the present invention, an improved phosphor layer of the present invention which is illustrated at 33 comprises a quad blend of four phosphors of which two are red-emitting phosphors. Although dual phosphor layers are shown in FIG. 1, the quad blend of the present invention may be utilized as a single coat.

In FIG. 1, the dual layer comprises a first layer 35 deposited on the inner glass surface and a second phosphor layer or top layer 33 deposited on the first phosphor layer 35. The use of a dual phosphor layer permits the weight of phosphor utilized in the second or top coat to be reduced and a less expensive phosphor to be utilized as the first layer 35. The first layer 35 preferably comprises a finely divided fluorescent calcium haloapatite phosphor exhibiting the desired white color point. The second layer or top layer 33 comprises a quad phosphor blend on the inside of the tube so that a substantial portion of the ultraviolet radiation is converted to visible illumination having a white color. The relative proportions of the components in the blend are such that an enhanced color rendering index (CRI) is produced, as compared to a tri-component phosphor blend with a single red-emitting component. The amount of the quad-phosphor blend applied is generally between about 10 percent and 50 percent of the total combined phosphor weight of the two coats.

The first layer or inner coating typically comprises a halogenated alkaline earth phosphate with the activator element being lead, manganese, antimony or tin. The host has the apatite structure, a typical example being calcium chlorophosphate $3Ca_3(PO_4)_2 \cdot CaCl_2$. Many modifications are possible including partial substitutions of the alkaline-earth cations by other divalent metals such as zinc and cadmium. Also, partial substitutions of the chloride by fluoride ions is desirable for some applications.

Phosphor materials which result from these combinations generally exhibit good luminescence when stimulated by short (253.7 nanometers) ultraviolet radiation, the response being greatest when the materials are synthesized to produce small deviations from stoichiometry. In particular, activation by combinations of antimony and manganese will produce a wide spectrum of luminescent emissions from alkaline-earth phosphates excited by ultraviolet light. Thus, these phosphors have wide application in fluorescent lamps and may be adjusted in composition to provide white light which varies from "cool" to "warm" white. Typical phosphors are "Warm White" (Sylvania Type 4300) and "Cool White" (Sylvania Type 4450). In the present invention, the preferred phosphors provide a light in the "Warm White" region, more particularly a "Royal White". Although the above calcium chlorophosphate phosphors are economical, improvements to color rendering and efficacy is desirable.

Figure 2:
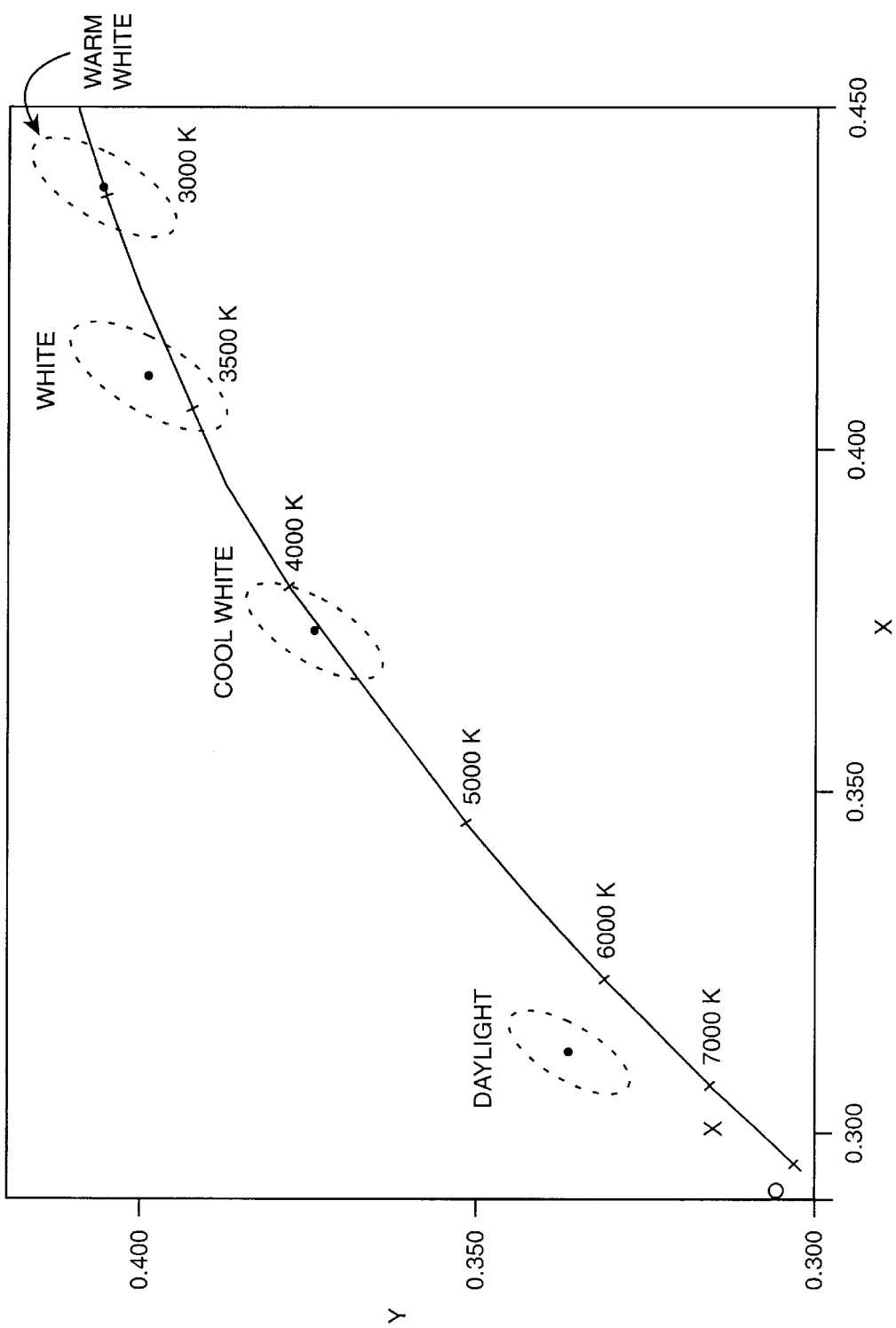
FIG. 2 is and x-y chromaticity diagram according to the 1931 standard showing spectroradiometrically determined assignments according to the ANSI Colorimetric Standard C78.3768-1966 for fluorescent lamps. See IES LIGHTING HANDBOOK, pg. 5–15, Fifth Edition, Illuminating Engineering Society, (1972).
Figure 3:
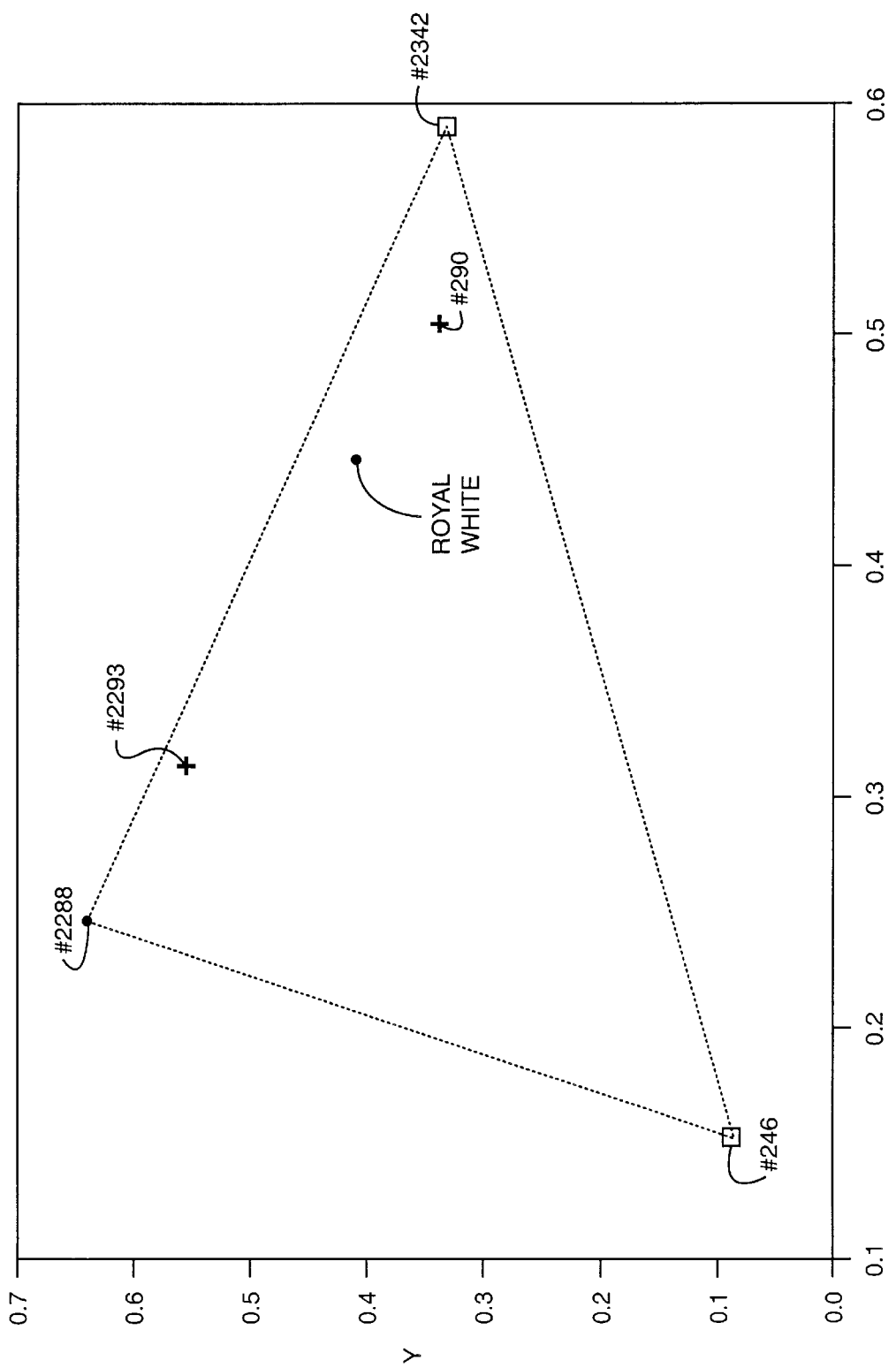
FIG. 3 graphically illustrates the range of lamp colors of the present invention on a CIE 1931 standard calorimetric observer x-y chromaticity diagram.

The relative proportions of the components of the quad-phosphor, light-generating blend are such that when their individual emissions are blended, there is produced visible light having the ICI coordinates x=0.4487 and y=0.4091 corresponding to a Warm White and sometimes more particularly called a Royal White on the Colorimetric Standard of FIG. 2. A preferred range of ICI coordinates has the x value in the range of 0.425 to 0.45, and the y value in the range of 0.375 to 0.425. The correlated color temperature is preferably from about 2750 to about 2850 K, more preferably from about 2800K to about 2900K. The most preferred correlated color temperature is 2850K. Additionally, the relative proportions of the components are such that an enhanced color rendering index is produced as compared to a tri-component blend formed from a three-phosphor blend including only one red-emitting component.

In the four-component phosphor-blend, the first red-emitting phosphor is a rare earth activated phosphor, preferably europium in the plus three valence state. Typical line-emitting "red" phosphors are activated by trivalent europium. Preferred red-emitting phosphors are europium-activated yttrium vanadium oxide ($YVO_4:Eu^{+3}$), europium-activated gadolinium oxide ($Gd_2O_3:Eu^{+3}$), and europium-activated yttrium oxide ($Y_2O_3:Eu^{+3}$). A most preferred red-emitting phosphor is yttrium oxide activated by trivalent europium, having a peak emission at 611 nm and available as Sylvania Type 2342.

The second red-emitting phosphor is an alkaline earth metal activated phosphor, preferably a manganese activated phosphor. Divalent and tetravalent manganese are both red emitters. A typical phosphor incorporating plus four manganese is a manganese activated fluoro-germanate. Fluoro-germinate has the composition $Mg_{28}Ge_{7.5}O_{38}F_{10}$. In the context of the present disclosure, the preferred manganese activator is divalent manganese. Even more preferred is a doubly-activated manganese- and lead-containing phosphor. Calcium silicate activated by lead and manganese having the formula $CaSiO_3:Pb;Mn$ is preferred. Sylvania phosphor Type 290 having the formula $\beta$-$CaSiO_3:Pb;Mn$ is used in the examples. In this phosphor Pb is instrumental in absorbing the UV radiation at 254 nm, and transferring it to the $Mn^{2+}$ emitting centers. The latter produce an emission band in the red spectral region with peak at 612 nm for a manganese content of 0.066 atom/mol. The intensity of red emission rises with increasing $Mn^{+2}$ with a corresponding decrease in the ultraviolet emission from $Pb^{+2}$.

The third phosphor component is a blue-emitting phosphor with a narrow emission band. Typical blue-emitting phosphors of this kind are (divalent) europium-activated barium magnesium aluminate, europium-activated strontium chlorophosphate, and europium activated strontium barium calcium chlorophosphate. The preferred blue emitting phosphor is a barium magnesium aluminate activated by divalent europium and having a peak emission at 455 nm, such a phosphor with the formula $BaMg_2Al_{16}O_{27}:Eu^{+2}$ being available as Sylvania Type 246 or 2461.

The fourth phosphor component is a green-emitting phosphor which can be either rare earth activated or containing non-rare-earth emitting centers. Typical "green" rare-earth-activated phosphors comprise Tb—Ce activated magnesium aluminate, Tb—Ce activated yttrium silicate, and Tb—Ce activated lanthanum orthophosphate. One preferred rare-earth activated green phosphor is the Tb—Ce activated lanthanum orthophosphate having the formula $LaPO_4$:Ce, Tb. U.S. Pat. No. 4,423,349 to Nakajima et al sets forth the structural formula $La_xTb_yCe_zPO_4$ where x+y+z=1; x is greater than 0.05 and less than 0.35, y is greater than 0.05 and less than 0.3, and z is greater than 0.6 and less than 0.9. This type of phosphor is commercially available from the Nichia company as Type NP220 phosphor. A preferred Sylvania phosphor is Type 2211, $LaPO_4$:Ce,Tb, known as LAP. Another preferred rare earth activated green phosphor is magnesium hexa-aluminate:Ce;Tb which, as utilized in the examples, is Sylvania Type 2293.

Generally, phosphors that do not contain rare-earths, are to be preferred for reasons of lower cost. Manganese is a preferred activator for the production of green emission. As in magnesium gallate and magnesium aluminate having the respective formula $MgGa_2O_4$:Mn and $MgAl_2O_4$:Mn, and in zinc orthosilicate phosphor with the formula $Zn_2SiO_4$:Mn. As used herein, "green-emitting zinc orthosilicate phosphor" includes any phosphor having a zinc orthosilicate matrix which is activated by at least manganese (II) ions, and which emits light having a peak wavelength of approximately 520–540 nm under 253.7 nanometer excitation. For example, "green-emitting zinc orthosilicate phosphor" is intended to include zinc orthosilicate phosphors having a matrix which may be stoichiometric or non-stoichiometric with respect to zinc, silicon, or oxygen, as well as those which may have a lattice defect. "Green-emitting zinc orthosilicate phosphor" is further intended to include such phosphors in which the zinc cation has been partially replaced by other cations. See, for example, U.S. Pat. No. 4,231,892 to Chang et al. or U.S. Pat. No. 4,551,397 to Yaguchi et al. Also intended to be included within the scope of "green-emitting zinc orthosilicate phosphors" as used herein is such phosphor which has one or more activators in addition to manganese (II). U.S. Pat. No. 4,728,459 to Fan describes a manganese-activated zinc silicate phosphor containing a small amount of tungsten to improve maintenance, which may be utilized in the present invention.

The preferred green-emitting zinc orthosilicate phosphor has a continuous aluminum oxide coating surrounding individual phosphor particle. Continuous refers to the non-particulate nature of the coating on each coated particle, while conformal refers to the coating replication of the submicron surface features found naturally occurring in the uncoated phosphor particles. Such a coated phosphor is made by the techniques described in U.S. Pat. No. 4,825,124 to Sigai. As set forth therein, the continuous aluminum oxide coating is deposited by chemical vapor deposition in a fluidized bed, e.g., an aluminum-containing precursor material is deposited on the outer surface of phosphor powder particles while the particles are suspended in an inert gas stream and the aluminum-containing precursor material is reacted to form aluminum oxide. Examples of suitable precursors of the aluminum-containing compounds include alkyl aluminum compounds, aluminum alkoxides, and aluminum acetylacetonates.

A coated zinc orthosilicate phosphor is described in copending application Ser. No. 06/902,265 (D 86-1-062), entitled PHOSPHOR PARTICLE, PHOSPHOR BLEND, AND FLUORESCENT LAMP, now abandoned. The zinc orthosilicate phosphor has a continuous aluminum oxide coating surrounding its outer surface and has the empirical formula $Zn_{(2.00-x-y)}Mn_xSiO_{(4.00-y)}(WO_3)_z$, wherein x is from 0.04 to 0.15, y is from 0 to 0.05, and z is from 0 to 0.002. As set forth therein, the phosphor is prepared in such a manner that entirely all of the Mn is in the plus two valence state. Such preparation as is disclosed in detail is incorporated into the present specification.

The most preferred zinc orthosilicate phosphor comprises a bi-layer CVD coating as taught by Sigai and Klinedinst in U.S. Pat. No. 5,051,277 entitled "Method of Forming a Protective Bi-Layer Coating on Phosphor Particles and U.S. Pat. No. 5,087,523 entitled "Phosphors with Improved Lumen Output and Lamps Made Therefrom". As set forth in the above patents, the green-emitting zinc orthosilicate phosphor activated with manganese, also known by the mineral name willemite, can be improved by the application of a bi-layer coating prior to annealing. The bi-layer consists of a thin coating of silica applied between the base phosphor and a conformal alumina coating which is exposed to the mercury discharge. The silica coating prevents reaction between the zinc silicate phosphor and the alumina coating, as set forth in the above patents.

A method for forming a continuous layer of silica on phosphor particles is disclosed in the above patents. The method comprises vaporizing a silicon containing precursor such as tetramethyloxysilane or tetraethoxyorthosilane into an inert carrier gas and passing this gas through the phosphor powder. The phosphor particles are enveloped in the precursor at a temperature of greater than 400 degrees Centigrade. An oxidizing gas is passed into the phosphor powder which reacts with the precursor to form a continuous coating of silica on the phosphor particles. The resulting silica coated phosphor is preferably further coated with alumina.

FIG. 2 demonstrates illustrates an x-y chromaticity diagram showing the placement of the standard fluorescent colors of cool white, white, and warm white on a standard chromaticity diagram. The phosphor blend of the present invention is preferably in the region known as "Warm White".

The following detailed examples are given to enable those skilled in this art to more clearly understand and practice the present invention.

The phosphor layer is applied by techniques known in the art. A phosphor coating suspension is prepared by dispersing the phosphor particles in a water-based system employing polyethylene oxide and hydroxyethyl cellulose as the binders with water as the solvent. The phosphor suspension is applied by causing the suspension to flow down the inner surface of the bulb. Evaporation of the water results in an insoluble layer of phosphor particles adhering to the inside surface of the bulb wall. The layer is then dried. The first layer can be for example a calcium halophosphate activated by antimony and manganese applied from a liquid suspension as a layer directly adjacent to the inner surface of the lamp envelope. If the first layer is a halophosphate, then the second layer is the quad blend of the present invention which may be applied in the similar manner as the first layer.

The phosphor types given in the Examples below have identifying numbers utilized by GTE Products Corporation, Towanda, Pa., and are known as "Sylvania" phosphors.

In one case, as shown in Table 1, the four-component blend contained: Sylvania Type 246 Ba:Mg hexa-aluminate activated with $Eu^{+2}$ as the blue-emitting component; Sylvania Type 2293 (Ce,Tb)Mg hexa-aluminate as the green emitting component; Sylvania Type 2342 yttrium oxide:Eu as the rare-earth red-emitting component; and the Sylvania Type 290 $\beta$-$CaSiO_3$:Pb;Mn as the non-rare-earth red-emitting component.

TABLE 1a

QUAD-PHOSPHOR BLENDS

| Blue (#246) | Green (#2293) | Red (#290) | R.E. Red (#2342) | Lumens | CRI |
|---|---|---|---|---|---|
| 0.064 | 0.415 | 0.037 | 0.485 | 3494.78 | 84.80 |
| 0.063 | 0.404 | 0.078 | 0.455 | 3452.75 | 84.77 |
| 0.062 | 0.391 | 0.124 | 0.423 | 3405.66 | 84.63 |
| 0.061 | 0.371 | 0.200 | 0.369 | 3328.31 | 84.15 |
| 0.060 | 0.362 | 0.235 | 0.343 | 3292.08 | 83.73 |
| 0.059 | 0.343 | 0.303 | 0.295 | 3222.73 | 82.46 |
| 0.058 | 0.335 | 0.335 | 0.272 | 3189.59 | 81.78 |
| 0.057 | 0.322 | 0.382 | 0.239 | 3142.34 | 80.75 |
| 0.056 | 0.309 | 0.431 | 0.204 | 3092.01 | 79.59 |
| 0.055 | 0.298 | 0.474 | 0.173 | 3048.05 | 78.52 |
| 0.054 | 0.275 | 0.558 | 0.113 | 2962.19 | 76.29 |
| 0.053 | 0.268 | 0.584 | 0.095 | 2935.92 | 75.58 |
| 0.052 | 0.254 | 0.639 | 0.055 | 2879.73 | 73.99 |

The predictions on the performance of phosphor blends are based on the following considerations. The basic input data are the spectral power distribution (SPD) from 40 Watt-T12 fluorescent lamps containing a single phosphor. These SPD arrays describe lamp output in power units over the typical spectral range 380 nm–760 nm, and are generally measured in the industrially after 100 hours of lamp operation.

Let us assume now that we want to predict the performance of a four-component phosphor blend in a 40 Watt-T12 lamp. Then the SPD's must be measured for four lamps, each containing an individual phosphor-blend component.

The four SPD's are then mathematically manipulated to produce a lamp output, expressed as a total (or blend) SPD, whose color coordinates, lumen output and color-rendering index (CRI) meet some pre-assigned target values. The intrinsic assumption in the derivation is that the blend component will be randomized in the lamp, so that the output from the phosphor blend is a superposition of the output from the individual blend-components.

The blend fractions listed in Table 1a are therefore photometric in nature, they are SPD fractions. In the special case that the single-component lamps have the same phosphor weight, then the SPD fractions are also weight fraction for the phosphor-blend components. Since the powder weights of the single-component lamps are generally different, the transition from SPD fractions to weight fractions is a simple matter of multiplying the SPD fraction by the powder-weight of the corresponding lamp, and of re-normalizing, as shown below. Let $P_n$ be the photometric (SPD) fraction for blend component n in Table 1a, and $s_n$ the phosphor powder weight of the single-component lamp for blend component n (see Table 1b). Then the blend fractions $w_n$ in weight units are given by:

$$w_n = (p_n \cdot s_n) : (\Sigma_n p_n \cdot s_n) \quad (1)$$

with n=1,2,3, and 4.

In the specific case of the phosphors under discussion, the pertinent values for $s_n$ (in grams) and for the 100 hrs lumen-output from the single-component lamps are listed in Table 1b.

TABLE 1b

Composition, powder weight, and output characteristics of single-component W40-T12 lamps utilized in the derivation.

| Phos. type Sylvania | Emiss. Color | Rare Earth | Weight (grams) | lumen at 100 hrs | Color Coordinates X | Y |
|---|---|---|---|---|---|---|
| #246 | blue | yes | 5.2 | 1,006 | 0.151 | 0.088 |
| #2293 | green | yes | 6.6 | 4,730 | 0.315 | 0.554 |
| #2288 | green | no | 6.0 | 4,900 | 0.247 | 0.635 |
| #290 | red | no | 3.1 | 2,300 | 0.589 | 0.331 |
| #2342 | red | yes | 6.1 | 2,858 | 0.506 | 0.377 |

On applying eq. 1, the entries of Table 1a will be mapped into the entries of Table 1c, where the blend fractions are now expressed as weight percent of the total blend-weight.

TABLE 1c

Blend compositions (in weight percent) and predicted blend-lamp output.

| Sylvania Phosphor Type | | | | | | Blnd Wt |
|---|---|---|---|---|---|---|
| #246 | #2293 | #290 | #2342 | Lumens | CRI | (grams) |
| 0.054 | 0.446 | 0.019 | 0.481 | 3490.78 | 84.8 | 6.14 |
| 0.054 | 0.444 | 0.04 | 0.462 | 3452.75 | 84.77 | 6.01 |
| 0.055 | 0.44 | 0.066 | 0.44 | 3405.66 | 84.63 | 5.87 |
| 0.056 | 0.434 | 0.11 | 0.399 | 3328.31 | 84.15 | 5.64 |
| 0.057 | 0.433 | 0.132 | 0.379 | 3292.08 | 83.73 | 5.52 |
| 0.058 | 0.426 | 0.177 | 0.339 | 3222.73 | 82.46 | 5.31 |
| 0.058 | 0.424 | 0.199 | 0.318 | 3189.59 | 81.78 | 5.21 |
| 0.059 | 0.42 | 0.234 | 0.288 | 3142.34 | 80.75 | 5.06 |
| 0.059 | 0.415 | 0.272 | 0.253 | 3092.01 | 79.59 | 4.91 |
| 0.06 | 0.412 | 0.308 | 0.221 | 3048.05 | 78.52 | 4.78 |
| 0.062 | 0.402 | 0.383 | 0.153 | 2962.19 | 76.29 | 4.51 |
| 0.062 | 0.399 | 0.408 | 0.131 | 2935.92 | 75.58 | 4.43 |
| 0.063 | 0.393 | 0.465 | 0.079 | 2879.73 | 73.99 | 4.26 |

In the above case, the preferred blend of phosphors based on weight percent comprise: about 25 to about 50 weight percent of the rare-earth activated red-emitting phosphor; about 20 to about 30 percent of the no-rare-earth red-emitting phosphor; about 5.5 to about 6 percent of the blue-emitting phosphor; and about 40 to about 45 weight percent of the green emitting phosphor.

In Table 2a, the blend is similar to that of Tables 1a and 1c but with Sylvania Type 2282 willemite green replacing the Sylvania Type 2293 green.

TABLE 2a

QUAD-PHOSPHOR BLENDS

| Blue (#246) | Green (#2288) | Red (#290) | R.E. Red (#2342) | Lumens | CRI |
|---|---|---|---|---|---|
| 0.0770 | 0.3176 | 0.0333 | 0.5721 | 3345.90 | 78.16 |
| 0.0749 | 0.3018 | 0.1108 | 0.5125 | 3274.22 | 80.19 |
| 0.0734 | 0.2908 | 0.1646 | 0.4712 | 3224.55 | 81.61 |
| 0.0716 | 0.2776 | 0.2294 | 0.4215 | 3164.65 | 83.34 |
| 0.0699 | 0.2646 | 0.2929 | 0.3727 | 3105.96 | 84.99 |
| 0.0675 | 0.2474 | 0.3768 | 0.3082 | 3028.38 | 86.89 |
| 0.0647 | 0.2264 | 0.4799 | 0.2290 | 2933.05 | 87.78 |

TABLE 2a-continued

QUAD-PHOSPHOR BLENDS

| Blue (#246) | Green (#2288) | Red (#290) | R.E. Red (#2342) | Lumens | CRI |
|---|---|---|---|---|---|
| 0.0638 | 0.2197 | 0.5126 | 0.2039 | 2902.79 | 87.61 |
| 0.0611 | 0.1998 | 0.6097 | 0.1293 | 2813.05 | 85.50 |
| 0.0603 | 0.1936 | 0.6400 | 0.1060 | 2785.02 | 84.61 |
| 0.0584 | 0.1792 | 0.7105 | 0.0519 | 2719.87 | 82.25 |
| 0.0570 | 0.1692 | 0.7594 | 0.0144 | 2674.72 | 80.41 |

Table 2a, which is the analog of Table 1a, expresses the phosphor-blend compositions in terms of photometric units (SPD fractions). Again applying eq. 1, the entries of Table 2a are converted to the weight-percent fractions listed in Table 2b.

TABLE 2b

Blend compositions (in weight percent) and predicted blend-lamp output.

Sylvania Phosphor Type

| #246 | #2288 | #290 | #2342 | Lumens | CRI | Blnd Wt |
|---|---|---|---|---|---|---|
| 0.0679 | 0.3230 | 0.0175 | 0.5916 | 3345.90 | 78.16 | 5.89 |
| 0.0688 | 0.3193 | 0.0606 | 0.5513 | 3274.22 | 80.19 | 5.67 |
| 0.0693 | 0.3166 | 0.0926 | 0.5216 | 3224.55 | 81.61 | 5.51 |
| 0.0700 | 0.3131 | 0.1337 | 0.4833 | 3164.65 | 83.34 | 5.32 |
| 0.0708 | 0.3093 | 0.1769 | 0.4430 | 3105.96 | 84.99 | 5.13 |
| 0.0719 | 0.3040 | 0.2392 | 0.3850 | 3028.38 | 86.89 | 4.88 |
| 0.0735 | 0.2966 | 0.3249 | 0.3050 | 2933.05 | 87.78 | 4.57 |
| 6.0740 | 0.2941 | 0.3545 | 0.2775 | 2902.79 | 87.61 | 4.48 |
| 0.0757 | 0.2857 | 0.4505 | 0.1880 | 2813.05 | 85.50 | 4.19 |
| 0.0764 | 0.2829 | 0.4832 | 0.1575 | 2785.02 | 84.61 | 4.10 |
| 0.0779 | 0.2758 | 0.5650 | 0.0812 | 2719.87 | 82.25 | 3.89 |
| 0.0790 | 0.2705 | 0.6272 | 0.0234 | 2674.72 | 80.41 | 3.75 |

In the above case, the preferred blend of phosphors based on weight percent comprises: about 25 to about 40 weight percent of the rare-earth activated red-emitting phosphor; about 35 to about 50 percent of the no-rare-earth red-emitting phosphor; about 6 to about 7 percent of the blue emitting phosphor; and about 20 to about 25 weight percent of the green-emitting no-rare-earth phosphor.

Figure 4:
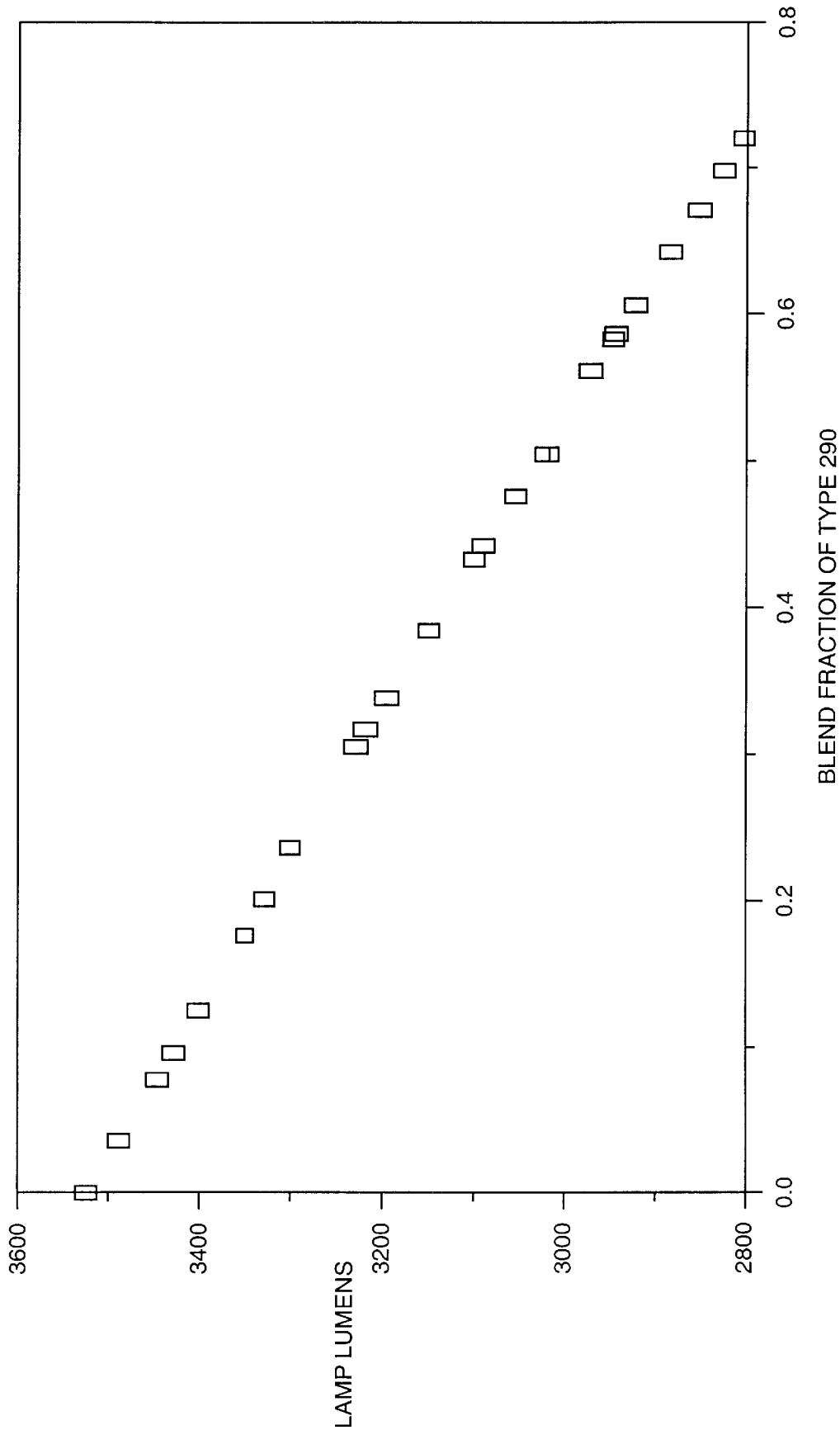
FIG. 4 graphically illustrates the lamp lumens on the y-axis vs. blend fraction of (non-rare-earth) red-emitting phosphor as set forth in Table 1a, for the case of rare-earth-containing green-emitter.
Figure 5:
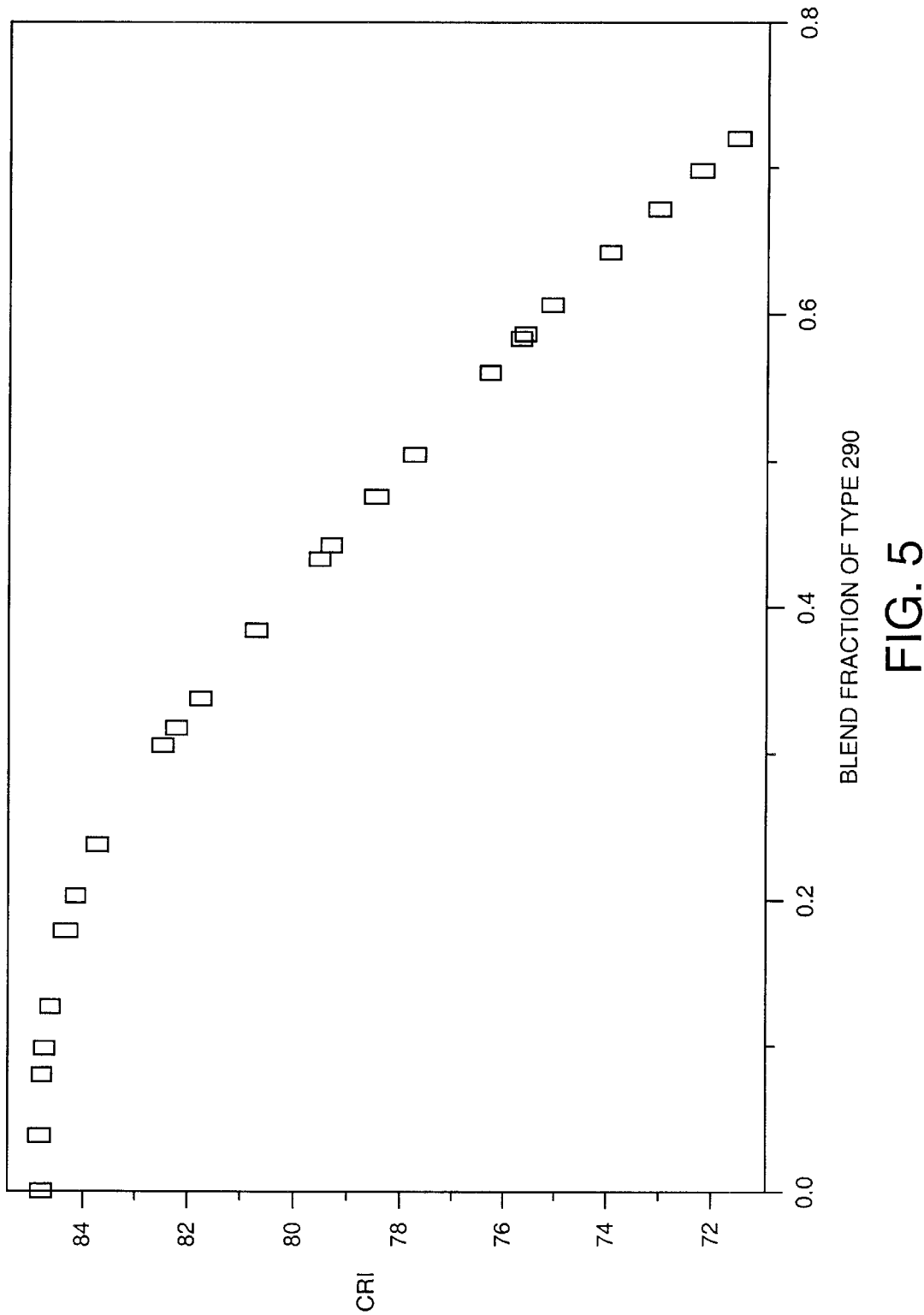
FIG. 5 graphically illustrates the CRI on the y-axis vs. blend fraction of (non-rare-earth) red-emitting phosphor as set forth in Table 1a, for the case of a rare earth containing green emitter.

The results are summarized in FIGS. 4 to 7. As indicated in FIGS. 4 and 5, the addition of the no-rare earth beta-metasilicate phosphor to the blend containing the Tb-activated green emitter produces a gradual, linear drop in lumen output as the silicate red-emitter replaces the $Y_2O_3$:Eu phosphor. The corresponding curve for the CRI shows no marked change in color-rendering properties as the red Sylvania Type 290 phosphor fraction is increased up to 20 percent as shown in FIG. 5. At higher fractional contents of the Type 290 phosphor the CRI decreases superlinearly.

Figure 6:
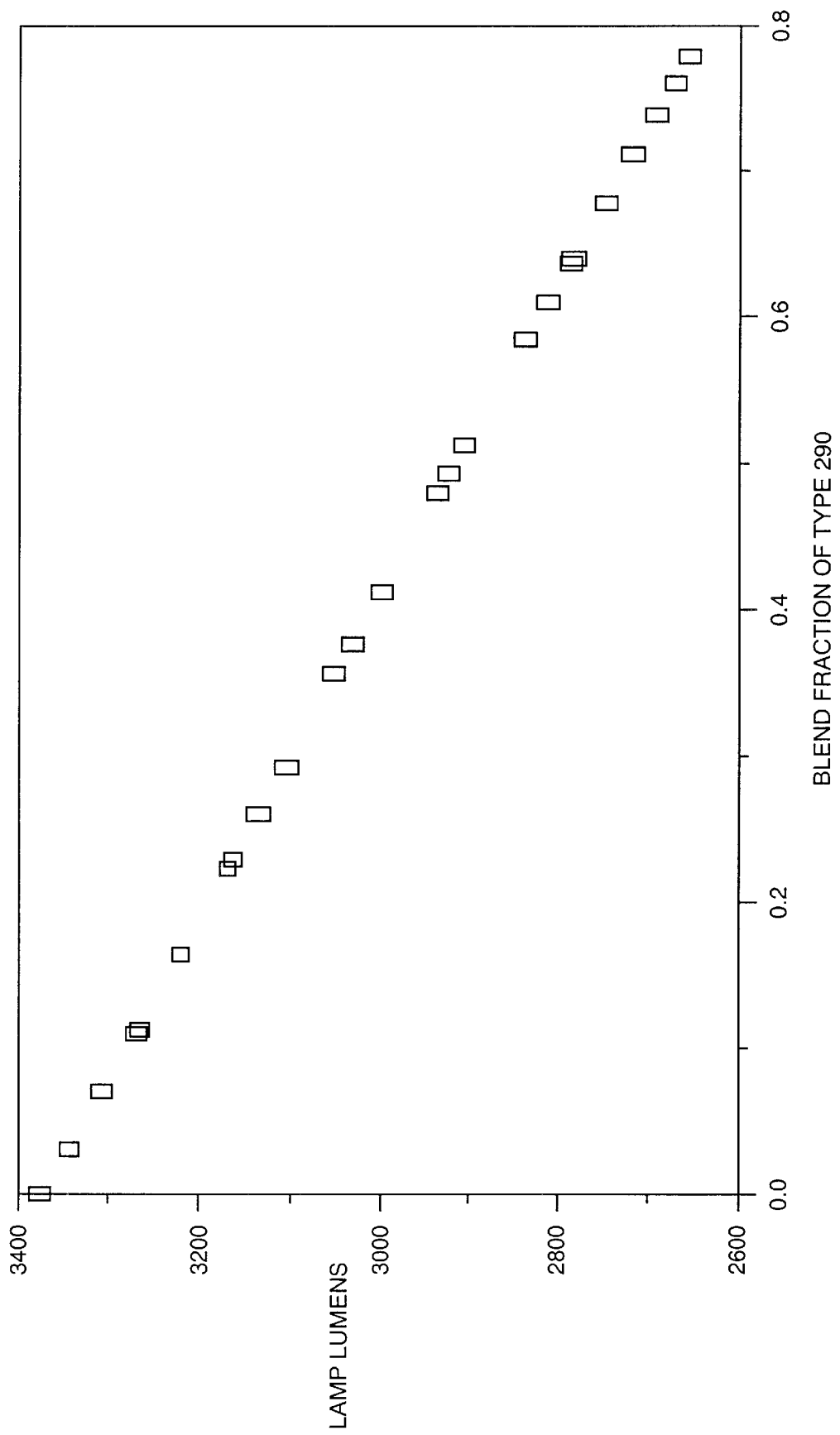
FIG. 6 graphically illustrates the lamp lumens on the y-axis vs. blend fraction of (non-rare-earth) red-emitting phosphor as set forth in Table 2a, for the case of a Mn-containing green emitter.
Figure 7:
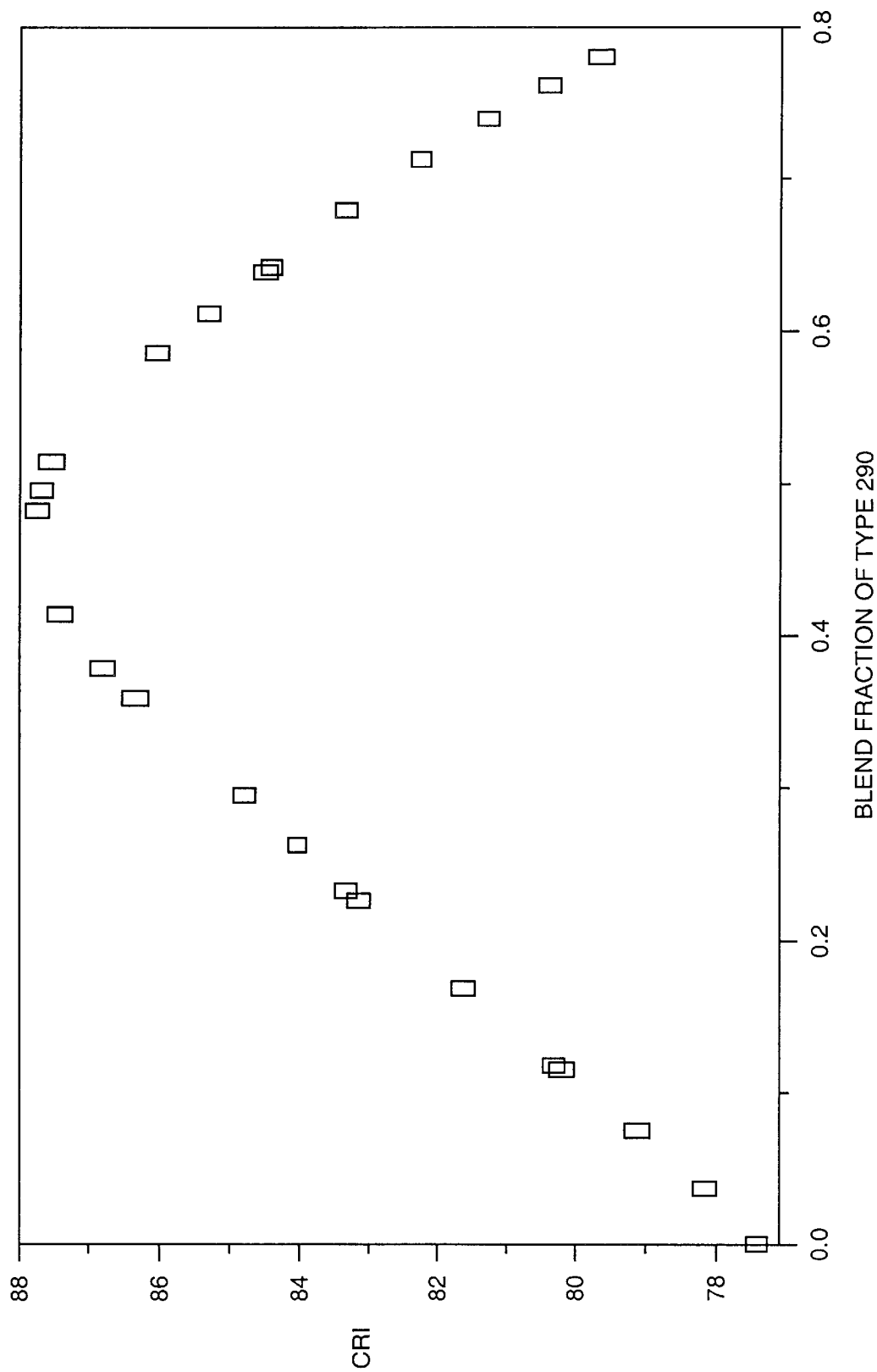
FIG. 7 graphically illustrates the CRI on the y-axis vs. blend fraction of (non-rare-earth) red-emitting phosphor as set forth in Table 2a, for the case of Mn-containing green emitter.

As illustrated in FIG. 6 and FIG. 7, a different situation is obtained when the green-emitting component is the willemite phosphor. Although the lumen output decreases linearly as the Sylvania Type 290 fraction is raised, as shown in FIG. 6, the color rendering index rose from the value of 77, in the absence of the Type 290 phosphor, to almost 88 for a fractional content of 45 percent in the Type 290 phosphor.

The data plotted in FIG. 1 to FIG. 2 are also shown in Tables 1a and 2a. Table 1a pertains to a blend containing the Sylvania Type 2293 material and Table 2b applies to blends containing the willemite phosphor.

A cost advantage generally results from the use of the Sylvania Type 290 phosphor, in the sense that both the relative content of the expensive red-emitting component Sylvania Type 2342 and the blend weight is reduced (Table 2b) in the blends containing willemite as the green-emitting component. In a blend optimized for color rendering, the amount of phosphor Type 2342 is decreased by almost 70 percent.

When the green emitting component is the Tb-activated material, the introduction of the Type 290 phosphor leads to a decrease in the fractional content of the red-emitting and green-emitting components, each of high cost because of the high content in Eu or Tb.

What is claimed is:

1. A fluorescent lamp comprising a glass envelope having electrodes at its ends, a mercury and inert gas filling within said envelope which produces ultraviolet radiation, a coating comprising at least one layer of a quad-phosphor blend for converting a substantial portion of said ultraviolet radiation to visible illumination, said blend comprising a first and second red-emitting phosphor components, each red-emitting phosphor component having different visible emission spectrum principally in the 590 to 630 nm wavelength range, a third blue-emitting phosphor component having an emission spectrum principally in the 430 to 490 nm wavelength range, and a fourth green-emitting phosphor component having an emission spectrum principally in the 500 to 570 nm wavelength range, said first red-emitting phosphor being a rare-earth activated phosphor and said second red-emitting component being a non-rare-earth containing phosphor wherein the relative proportions of the phosphor components are such that an enhanced color rendering index is produced as compared to tri-component blends formed from a three-phosphor blend consisting of the said first red-emitting component and said third and fourth components.

2. A fluorescent lamp according to claim 1 wherein said phosphor coating blend is adapted to convert a substantial portion of said ultraviolet radiation to visible illumination having a white color.

3. A fluorescent lamp according to claim 2 wherein said phosphor blend is on the interior surface of the glass envelope for converting the emitted ultraviolet radiation to visible illumination having a white color.

4. A fluorescent lamp according to claim 3 wherein said phosphor coating comprises a dual layer consisting of a first layer deposited on the inner glass surface and a second phosphor layer deposited on top of said first phosphor layer.

5. A fluorescent lamp according to claim 4 wherein said first layer comprises a halophosphate phosphor.

6. A fluorescent lamp according to claim 5 wherein the second layer comprises the four component blend of phosphors of sufficient thickness for converting a substantial portion of the ultraviolet radiation to visible illumination having a white color.

7. A fluorescent lamp according to claim 6 wherein said first layer comprises a finely divided fluorescent calcium haloapatite phosphor exhibiting the desired white color point.

8. A fluorescent lamp according to claim 3 wherein said visible light has predetermined x and y values of ICI coordinates wherein the x value is in the range of 0.425 to 0.45, and said y value is in the range of 0.375 to 0.425.

9. A fluorescent lamp according to claim 8 wherein the amount of said quad-phosphor blend is between about 10 percent and 50 weight percent of the total combined phosphor weight of said first and said second phosphor layers.

10. A fluorescent lamp according to claim 3 wherein said first red emitting rare earth activated phosphor is europium activated.

11. A fluorescent lamp according to claim 10 wherein said red emitting phosphor is europium activated gadolinium oxide or europium activated yttrium oxide or mixtures thereof.

12. A fluorescent lamp according to claim 10 wherein said second red emitting non-rare earth phosphor comprises manganese as an activator.

13. A fluorescent lamp according to claim 12 wherein said second red-emitting non-rare earth phosphor comprises divalent manganese as an activator.

14. A fluorescent lamp according to claim 13 wherein said second red-emitting non-rare earth phosphor comprises a doubly-activated manganese- and lead-containing phosphor.

15. A fluorescent lamp according to claim 14 wherein said second red-emitting non-rare earth phosphor comprises calcium silicate activated by lead and manganese and having the formula $CaSiO_3$:Pb;Mn.

16. A fluorescent lamp according to claim 12 wherein said blue-emitting phosphors are selected from the group consisting of europium-activated barium magnesium aluminate, europium-activated strontium chlorophosphate, and europium-activated strontium barium calcium chlorophosphate.

17. A fluorescent lamp according to claim 16 wherein said blue emitting phosphor has the formula $BaMg_2Al_{16}O_{27}$:$Eu^{+2}$.

18. A fluorescent lamp according to claim 12 wherein said fourth green emitting component comprises a rare earth activator.

* * * * *